United States Patent
Podder

(10) Patent No.: US 12,367,218 B2
(45) Date of Patent: Jul. 22, 2025

(54) SYSTEM FOR CONSOLIDATING DATA ATTRIBUTES FOR OPTIMIZING DATA PROCESSING AND A METHOD THEREOF

(71) Applicant: TECH MAHINDRA LIMITED, Pune (IN)

(72) Inventor: Soumyajit Podder, Kolkata (IN)

(73) Assignee: TECH MAHINDRA LIMITED, Pune (IN)

( * ) Notice: Subject to any disclaimer, the term of this patent is extended or adjusted under 35 U.S.C. 154(b) by 189 days.

(21) Appl. No.: 18/125,015

(22) Filed: Mar. 22, 2023

(65) Prior Publication Data

US 2024/0320240 A1    Sep. 26, 2024

(51) Int. Cl.
G06F 16/28     (2019.01)
G06F 16/215    (2019.01)
G06F 16/2457   (2019.01)
G06F 21/62     (2013.01)

(52) U.S. Cl.
CPC .......... *G06F 16/285* (2019.01); *G06F 16/215* (2019.01); *G06F 16/24573* (2019.01); *G06F 21/6245* (2013.01)

(58) Field of Classification Search
None
See application file for complete search history.

(56) References Cited

U.S. PATENT DOCUMENTS

| | | | |
|---|---|---|---|
| 10,360,252 B1 * | 7/2019 | Kraytem | G06F 16/215 |
| 10,725,981 B1 | 7/2020 | Florissi et al. | |
| 2018/0101805 A1 | 4/2018 | Park | |
| 2022/0012363 A1 * | 1/2022 | Colcord | G06F 16/211 |
| 2022/0334925 A1 * | 10/2022 | Rakesh | G06F 11/1451 |

FOREIGN PATENT DOCUMENTS

| | | |
|---|---|---|
| IN | 201841016411 | 5/2018 |
| IN | 202011016562 | 6/2020 |
| IN | 202241046254 | 8/2022 |

* cited by examiner

*Primary Examiner* — Amresh Singh
(74) *Attorney, Agent, or Firm* — HAYES SOLOWAY P.C.

(57) ABSTRACT

The present disclosure relates to system and method for consolidating data attributes for optimizing data processing. The method comprises defining objectives associated with data along with data outcome expected after processing of data from a sample dataset through processor. The data outcome is predicted based on metadata associated with the data from the sample dataset. The method further comprises identifying metadata insights for classifying metadata into a plurality of metadata types through metadata crawler, generating an experienced based metadata by filtering metadata with incomplete information from the metadata according to the objectives and data output expected through the processor. The experience-based metadata comprises one or more metadata types from the plurality of metadata types and generating consolidated sample data by using the experienced based metadata through the processor. The consolidated sample data is generated based on validation of the consolidated sample data through predefined rules.

12 Claims, 9 Drawing Sheets

SYSTEM FOR CONSOLIDATING DATA ATTRIBUTES FOR OPTIMIZING DATA PROCESSING AND A METHOD THEREOF

CROSS-REFERENCE TO RELATED APPLICATIONS AND PRIORITY

The present application does not claim priority from any patent application.

TECHNICAL FIELD

The present disclosure, in general, relates to a field of data mining and data analytics. More particularly, the present disclosure relates to a system and method for consolidating data attributes for optimizing data processing.

BACKGROUND

Data analytics is one aspect of data science. Conventional data analytics solutions are becoming more and more limited and complex due to the increasing sizes and varieties of data sets. For example, such limitations include the lack of ability to determine which datasets among the increasing sizes and varieties of data sets are relevant to solutions of any given complex data problems. Such huge data sets impose lots of overhead over machinery and thus deteriorates performance of a system.

The amount of data in current data driven world has been exploding. Companies captures trillions of bytes of information about their customers, suppliers, operations, etc. Organizations are simplifying data, business processes to enable and unlock the data and then applies analytics on top of the data to reveal new perspectives for improving success rate of organization level decisions.

However, with ongoing data growth and so many years of legacy approach and business units working in silos within the organization, any organization finds it hard to meet expectations of end users or business leaders on right time.

Many organizations are finding solutions by creating Datawarehouse, Data lakes, lake houses, Data-Hub or enabling Bigdata processing environment to handle or simplify data growth, variety, velocity and to enable data need and analytics or Machine learning algorithm's need. While building the warehouses or such huge data storages might be easier to achieve, however processing of data on daily basis may be a challenging task considering the volume, variety & velocity of the data.

Additionally, processing and computation of data, aggregations of data may require high operational cost as well as maintenance cost. Because of issues like high cost, time, and efforts to support the expected outcome, building the warehouses or such huge data storages are becoming non-growth area for the organizations. Most of time, IT techies derive analytics with available data within their own business unit and apply analytics on top which may result inadequate information to derive accurate business decisions and prediction. As a result, value of such process becomes very inefficient, ineffective, and legacy.

Further, considering only available data within business unit may lead to high risk of missing key requirements or introducing bugs which may turn out to be more costly at later stages in incorrect business decisions and incur loss for any organization.

SUMMARY

Before the present method and system for consolidating data attributes for optimizing data processing is described, it is to be understood that this application is not limited to the particular system, and methodologies described, as there can be multiple possible embodiments that are not expressly illustrated in the present disclosure. It is also to be understood that the terminology used in the description is to describe the particular versions or embodiments only and is not intended to limit the scope of the present application. This summary is not intended to identify essential features of the claimed subject matter nor is it intended for use in determining or limiting the scope of the claimed subject matter.

In one implementation, a method for consolidating data attributes for optimizing data processing is described. The method comprises defining objectives associated with data along with data outcome expected after the processing of the data from a sample dataset through a processor. The data outcome is predicted based on metadata associated with the data from the sample dataset. The method further comprises identifying metadata insights for classifying the metadata into a plurality of metadata types through a metadata crawler, generating an experienced based metadata by filtering metadata with incomplete information from the metadata according to the objectives and data output expected through the processor, wherein the experience-based metadata comprises one or more metadata types from the plurality of metadata types and generating consolidated sample data by using the experienced based metadata through the processor. The consolidated sample data is generated based on validation of the consolidated sample data through predefined rules.

In another implementation, a system for consolidating data attributes for optimizing data processing is described. The system comprises the processor and the memory. The memory is configured to storing a plurality of instructions to be executed by the processor. The processor is configured to define objectives associated with data along with data outcome expected after the processing of the data from a sample dataset, wherein the data outcome is predicted based on metadata associated with the data from the sample dataset. The processor is further configured for identifying metadata insights for classifying the metadata into a plurality of metadata types through the metadata crawler. The processor is further configured for generating the experienced based metadata by filtering metadata with incomplete information from the metadata according to the objectives and data output expected, wherein the experience-based metadata comprises one or more metadata types from the plurality of metadata types. The processor is further configured for generating consolidated sample data by using the experienced based metadata and the consolidated sample data is generated based on validation of the consolidated sample data through predefined rules.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
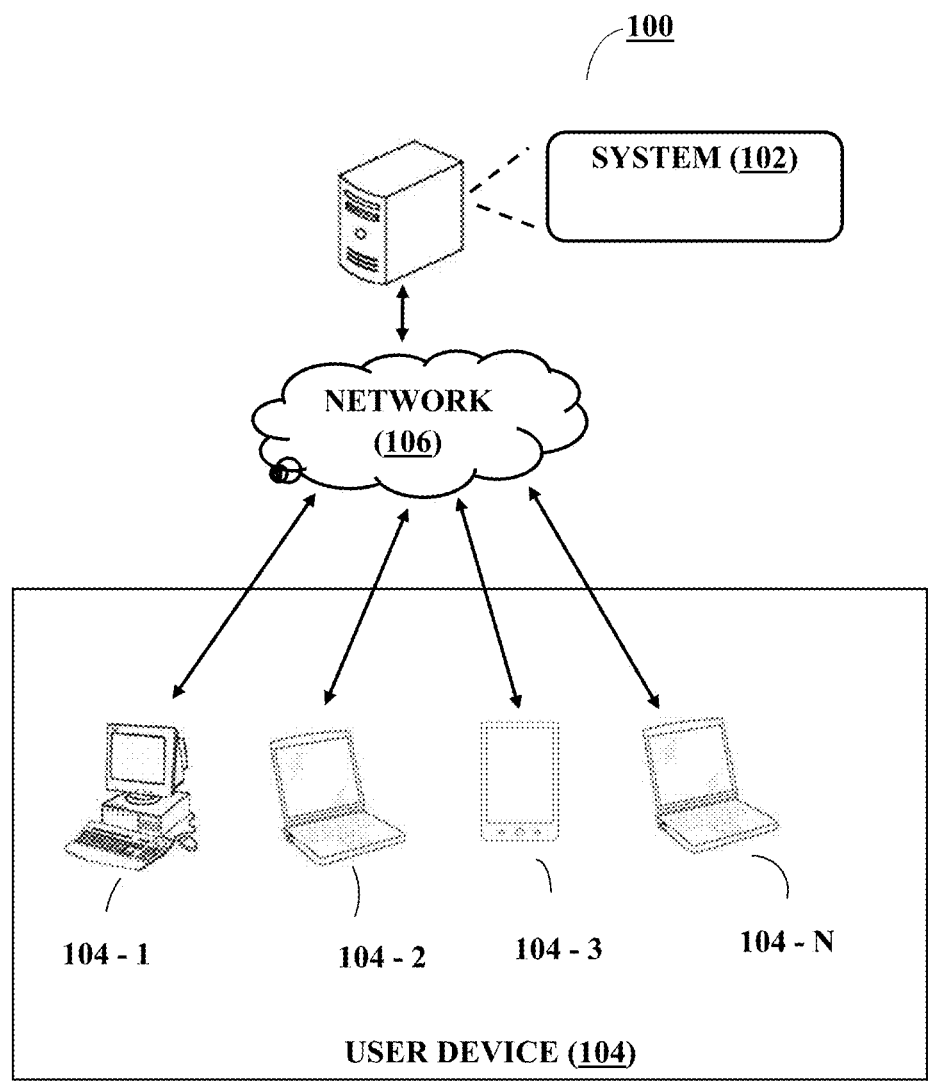
FIG. 1 illustrates a network implementation of a system for consolidating data attributes for optimizing data processing, in accordance with an embodiment of the present subject matter.

Some embodiments of the present disclosure, illustrating all its features, will now be discussed in detail. The words "comprising", "receiving", "determining", "assigning" and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for consolidating data attributes for optimizing data processing are now described. The disclosed embodiments of the systems and methods for consolidating data attributes for optimizing data processing are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for consolidating data attributes for optimizing data processing is not intended to be limited to the embodiments illustrated but is to be accorded the widest scope consistent with the principles and features described herein.

Traditional processes and system include lengthy & inefficient process and may have issues like high cost, time, and efforts to support the expected outcome. Most of time, IT techies derive analytics with available data within their own business unit and apply analytics on top which may result inadequate information to derive accurate business decisions and prediction. As a result, value of such process becomes very inefficient, ineffective, and legacy.

The present subject matter overcomes the problems of the existing system and method through the proposed system and method for consolidating data attributes for optimizing data processing. The present subject matter depicts a mechanism to move away from "data driven analytics" to "experience driven data mining and insights" and focus on a specific small dataset with widespread range across each vertical or segment or business units of businesses for any organization which significantly reduce data volume processing & turnaround time and business decisions can be made effectively and efficiently. The proposed system and method create small specific data sets which are less in the size from the huge datasets and such small datasets may then be processed effectively thus giving reliable and optimized output.

Referring now to the drawings, and more particularly to FIGS. 1 through 9(d), where similar reference characters denote corresponding features consistently throughout the figures, there are shown embodiments.

Referring now to FIG. 1, a network implementation of a system 102 for consolidating data attributes for optimizing data processing is disclosed. FIG. 1 is showing growing user devices, interconnection between the devices, generation of data or usage across multiple platforms and shows a need to optimize the storage, processing and network element in order to keep the speed, cost and quality. In one example, the system 102 may be connected with user devices 104-1 through 104-N (collectively referred as 104) through a communication network 106.

It should be understood that the system 102 and the user devices 104 correspond to computing devices. It may be understood that the system 102 may also be implemented in a variety of computing systems, such as a laptop computer, a desktop computer, a notebook, a workstation, a mainframe computer, a server, a network server, a cloud-based computing environment, or a smart phone and the like. It may be understood that the mobile devices 104 may correspond to a variety of a variety of portable computing devices, such as a laptop computer, a desktop computer, a notebook, a smart phone, a tablet, a phablet, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example), Hypertext Transfer Protocol (HTTP), Transmission Control Protocol/Internet Protocol (TCP/IP), and the like, to communicate with one another. Further, the communication network 106 may include a variety of network devices, including routers, bridges, servers, computing devices, storage devices, and the like.

Figure 2:
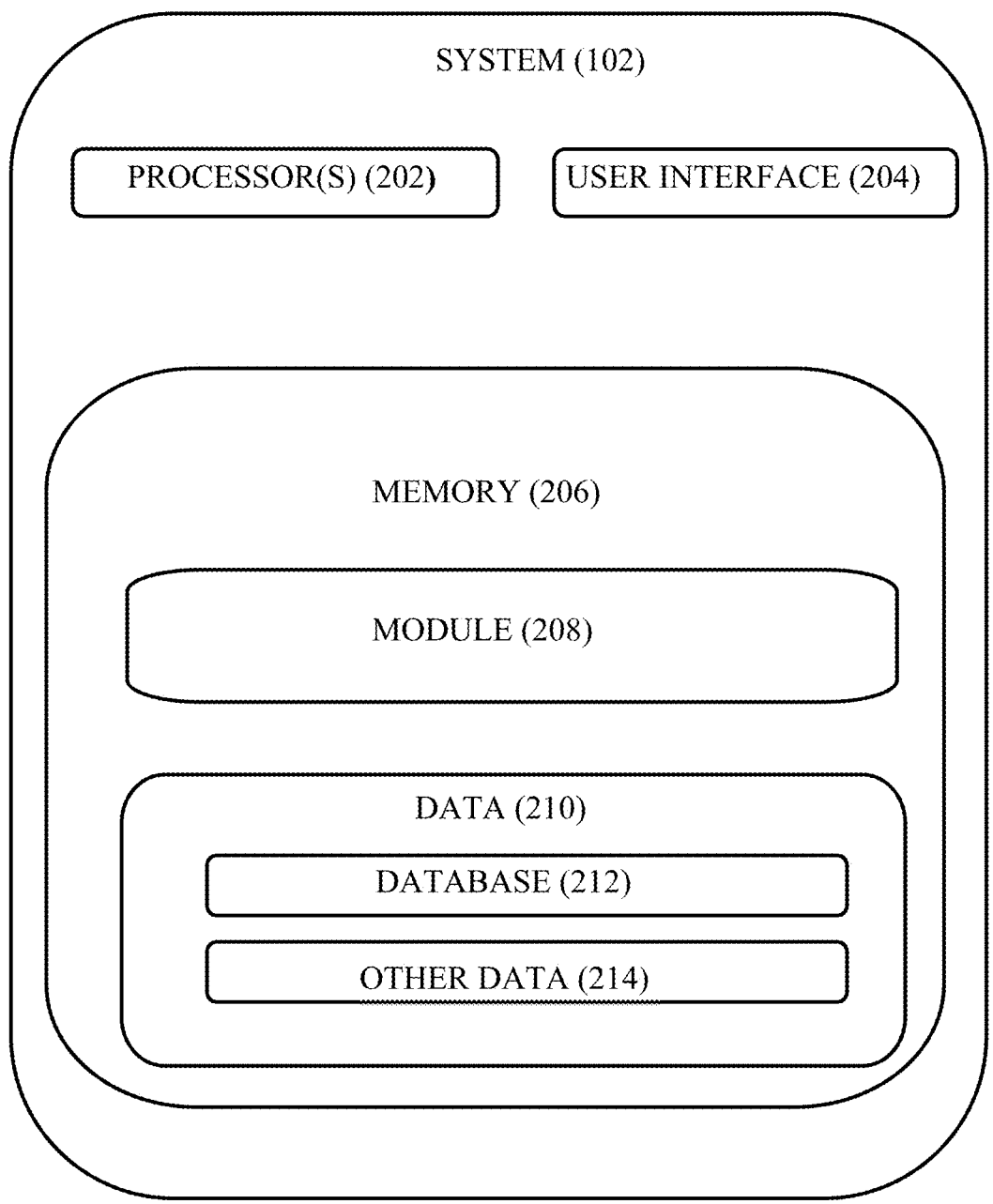
FIG. 2 illustrates a block diagram of the system for consolidating data attributes for optimizing data processing, in accordance with an embodiment of the present subject matter.

Referring now to FIG. 2, a block diagram 200 of the system 102 is illustrated in accordance with an embodiment of the present subject matter, more specifically FIG. 2 illustrates high level components of the platform. In an example, a user interface (204) for end user interaction and where data generation triggers, at least one processor (202) for initial processing and data cleansing and all the storage, analytics, transformation on collected and derived datasets are performed in Memory layer (206). In one embodiment, the system 102 may include the processor 202, the user interface 204 (may also as referred to input/output (I/O) interface), and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The user interface 204 may include a variety of software and hardware interfaces, for example, a web interface, a graphical user interface, a command line interface, and the like. The user interface 204 may allow a user to interact with the system 102. Further, the user interface 204 may enable the system 102 to communicate with the user devices 104, and other computing devices, such as web servers and external data servers (not shown). The user interface 204 can facilitate multiple communications within a wide variety of networks and protocol types, including wired networks, for example, LAN, cable, etc., and wireless networks, such as WLAN, cellular, or satellite. The user interface 204 may include one or more ports for connecting a number of devices to one another or to another server.

The memory 210, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. The modules 208 may comprise plurality of modules. The plurality of modules may comprise a metadata crawler, a defining module, an analyzing module, a rule engine, storage layer, a transformation and aggregation/computation module, a data Sharing module, a compliance and privacy component. The plurality of modules may be configured to execute a set of instructions and are not shown in FIG. 2 and details of each module from the plurality of modules is described later in FIG. 4(a).

The data 210 may include a database 212 for storing data processed, computed, received, and generated by one or more of the modules 208. Furthermore, the data 210 may include other data 214 for storing data generated as a result of the execution of modules than the ones mentioned above.

In an embodiment, the system 102 is configured to consolidate data attributes for optimizing data processing. The system 102 comprises the user interface 204, the memory 206 and the processor 202 coupled to the memory 206.

The processor 202 first defines objectives associated with the data (input data) along with data outcome expected after the processing of the data from a sample dataset. The data outcome is predicted based on metadata associated with the data from the sample dataset.

The metadata crawler is configured to identify metadata insights for classifying the metadata into a plurality of metadata types. The plurality of metadata types may include and not limited to business metadata, technical metadata and operational metadata. The technical metadata represents technical aspects of data, including attributes associated with data comprising data types, lengths, lineage, results from data profiling, information about origin of a data asset, wherein the technical metadata provides information about data sources, ownerships, transformations, freshness, usage, and archival of the data in the first dataset. The business metadata provides information about mapping information, business definitions, and rules information, domains or sub-domains associated with the data associated with the data. The operational data in an embodiment present here refers to information about job execution logs, policies, default access restrictions, data sharing rules, error logs, audit results, various version maintenance plans, archive, and retention rules. In an example, the policies are operational metadata policy which may include and not limited to naming convention of error and log files, debugging level, maximum file size beyond which it will create a new one, roles and access configuration of the files, rules related to keywords or format of the logs with minimum standards.

In accordance to an embodiment of the present disclosure, the system 102 provides the experience metadata which may be combination of business & technical, business and operational, or technical or operational along with persona-based experience driven metadata. Along with it, the system may extend a mechanism to sample data as well to determine catalog of the data if columns or data sources don't provide enough information.

The processor 202 then generate an experienced based metadata by filtering metadata with incomplete information from the metadata according to the objectives and data output expected. The experience-based metadata may include and not limited to one or more metadata types from the plurality of metadata types.

The processor 202 then generate consolidated sample data (alternatively may referred as experience driven data) by using the experienced based metadata, wherein the consolidated sample data is generated based on validation of the consolidated sample data through predefined rules. The predefined rules comprise Single Column Content, Cross Column or Composite Column Content, or Cross Table verification, wherein the rules are executed for monitoring data anomalies and identifying root causes of poor data quality before processing the consolidated sample data.

In an embodiment, during the Metadata identification and tagging process, based on keywords (known and unknown) in the columns, the algorithm may predict the domains, and verticals and tag the columns. The algorithm may include and not limited to a custom build algorithm for example, word2Vec. In an example, if any billing system is sending a credit card (Column name: CREDIT_CARD_NO) and CVV PIN no (Column name: CVV_PIN_NO) then the algorithm may detect "CREDIT/CRDT/CRDIT" or "CVV/PIN" keyword and tag them under Sensitive PIM (Personal Information Management) model/domain. In another example, if there is customer billing account no (Column name: CUST_BILL_ACCT_NO) or Customer Order No (Column Name: CUST_ORD_NO) then the algorithm may identify and tag them as "CUSTOMER" domain with "ACCOUNT" as sub-domain, whereas for later, it will identify it as "ORDER" domain.

In an embodiment, during rule-based data pre-validation stage, self-service exploration of data (based on Sampling of dataset) is used to identify errors and data anomalies (Special Characters, Missing values, format issues, flag duplicates, compare to business rules and assess data for consistency and completeness against rules). In an example, when a data is moving from one source to other source in a batch file process, if the data contains an email id not reflecting on the other source when the email id is not in proper format, the rule engine may detect a violation of rule and may trigger a message like "Failure Due to Special Character in the email." The Data Quality & Audit process examine the cause and may check for different options like, Special Character in the word (Rule Set 1), Format of the Email Address (Rule Set 2), Minimum character of the email Id must be more than 5 (Rule Set3). The system 102 may detect a violation through the rule engine of Rule Set 1 and may put a root cause summary as "Failure Due to Special Character in the email." The root cause information is also shown in below Table A.

TABLE A

| Fieldname | Root_Cause_Info |
|---|---|
| Email_ID | Format was wrong |
| Email_ID | Special Character presence |
| Email_ID | Replication Process was stopped |

In an embodiment, An AI driven process may parse the incoming dataset (source dataset or sample dataset) and may predict the root cause issues from the prior available patterns and rule sets. Similarly, the predictive error detection mechanism may be extended to all critical fields (mandatory) to make sure data is correct and accurate prior to consolidating the data.

In an embodiment, the system 102 is configured to apply data privacy rules while sharing the consolidated sample data with external users through an integration with external systems. The system 102 stores all kind of Personal Sensitive Information like Date of Birth (DOB), Social Security number (SSN), Credit Card No in Personal Identifiable Information (PII)_Reference_Table. During metadata identification phase, the system 102 may refer the PII_Reference_Table and parse each column names to tag it as PSI (Personal Sensitive Information) if matches partially or appropriately. If individual user requests for the data via case management portal, then sharing details will be encrypted (using voltage software filed level encryption) and if the system 102 is trying to share aggregated/consolidated dataset/Experience based or Use case based, then data clustering approach is followed to remove all reference of personal traceability of individual users. In an example, while sharing the data, the data may include 30% of teens like to use Apple, 60% of adult like to use Apple and 50% of Seniors may use Apple products, 40% of teens loves NFL, seniors are more targeted for any phone upgrade offer can be sent to avoid any traceability to actual users and ensure privacy. In an example, the data clustering approach may include and not limited to multi-class classification, agglomerative hierarchy clustering algorithm.

In accordance to an embodiment of the present disclosure, the rule engine is designed to ensure the data quality, and also checks if audit and enrichment is appropriate and initially validated against the predefined active and approved rule sets or matrix before proceeding to later data processing lifecycle (such as before analyze Trends and patterns of dataset, before applying AI (Artificial Intelligence), ML (Machine Learning)/Deep Learning/Quantum Computing: Guard Against biases or before consolidating the data). Ruleset specification may follow traditional process of "Single Column Content", "Cross Column/Composite Column Content", "Cross Table verification". An intelligent or predictive process may constantly monitor data anomalies and identify root causes of poor data quality & learn how to fix them and once the predictive process learns it, rules will route to get into rule matrix with possible work around for cleansing of the data. Example of identification of data anomaly is discussed in the above para and Table A.

In an embodiment, the present disclosure provides the system 102 and a method 300 (discussed later in detail) to consolidate only specific data attributes and hence may reduce overall data volume processing against rule engine and thereby improves processing of data across business units or verticals and normalize the data before applying further processing. For getting experience driven data, the overall method may save time and may make the system 102 effective, maintainable and cost efficient.

In accordance to an embodiment of the present disclosure, the system 102 provides a two-layer data model architecture to enable high availability of experience driven data with low latency. Data curation may happen via 2-table tier "multi-hop" architectures focused on only attributes which are needed to provide as "Experience". In an example, the two-layers data model may include Level-1 and Level-2. Level-1 may include raw level data set with Experience Driven attributes and Level-2 may include experience-based data set, which are aggregated, semi-aggregated or columnar. Pipelines and massive parallel processes may be built on each layer from the two-layers to make sure there is low latency and periodic updates as and when data gets available.

In an embodiment, the technical metadata represents the technical aspects of data, including attributes such as data types, lengths, lineage, results from data profiling along with information about the origin of a data asset. The technical metadata may inform about data sources, ownerships, transformations, freshness, usage, and archival. The business metadata gathers the mapping information, business definitions, and rules information. Various examples of operational metadata include job execution logs, data sharing rules, error logs, audit results, various version maintenance plans, archive, and retention rules.

In an exemplary embodiment, the sample Data processed by the system 102 for consolidating data attributes for optimizing data processing as shown in Table 1. Data consolidation is performed to derive a common experience driven metadata as shown in Table 1 is presented now.

TABLE 1

Data Received from Sources

| Name | DOB | Gender | Hobbies | Phone Model | Contract End Date | Passion | Address |
|---|---|---|---|---|---|---|---|
| S4 | Aug. 29, 2010 | M | Swimming, Art | Android | Jan. 1, 2024 | Books, Art, Cycling | Dallas |
| S6 | Dec. 27, 2007 | M | Swimming, Tennis | iPhone | Jan. 1, 2024 | NFL | Colorado |
| S7 | Dec. 27, 2006 | M | Books, NFL | Android | Nov. 27, 2023 | Cooking, Travel | Ohio |
| S8 | Dec. 28, 2004 | M | NFL, Stamps | iPhone | Apr. 2, 2023 | Yoga | Las Vegas |
| S29 | Mar. 29, 2005 | M | Farming | Android | Apr. 2, 2023 | Sports Car | Ohio |
| S30 | Feb. 14, 2005 | F | Nursing | iPhone | Nov. 27, 2023 | Art, Cycling | Dallas |
| S9 | Dec. 29, 2003 | F | Dance | Android | May 16, 2023 | NFL | New York |
| S26 | Sep. 27, 2006 | F | Soccer, Polo | iPhone | Jan. 1, 2023 | Gaming | Alabama |
| S27 | Apr. 27, 2004 | F | Soccer, Polo | Android | Jun. 2, 2023 | Sports Car | Utah |
| S28 | May 6, 2004 | F | Painting | Android | Jan. 1, 2023 | Travel | South Carolina |
| S2 | Aug. 29, 1990 | F | Baseball, Swimming | iPhone | Jun. 2, 2023 | Books | New York |
| S11 | Aug. 29, 1977 | F | Shopping | iPhone | Jun. 2, 2022 | NFL | Colorado |
| S14 | Aug. 29, 1985 | F | Tennis | iPhone | Oct. 15, 2022 | Cooking, Travel | Ohio |
| S15 | Aug. 29, 1983 | F | Gym | Android | Jan. 1, 2023 | Yoga | Las Vegas |
| S19 | Aug. 29, 1985 | F | Shopping | iPhone | Jan. 1, 2024 | Driving | Utah |
| S16 | Aug. 29, 1982 | M | Golf | Android | Apr. 2, 2023 | NFL | New York |
| S17 | Aug. 29, 1980 | M | Reading Books | Android | Dec. 31, 2022 | Travel | Atlanta |
| S18 | Aug. 29, 1987 | M | Grilling | iPhone | Nov. 27, 2023 | Gaming | Alabama |
| S20 | Aug. 29, 1988 | M | Farming | Android | Dec. 1, 2022 | NFL | South Carolina |
| S1 | Aug. 29, 1980 | M | Soccer, Polo | iPhone | Jan. 1, 2023 | Travel | California |
| S3 | Aug. 29, 1970 | M | Golf | Android | Oct. 1, 2023 | Food | Atlanta |
| S22 | Dec. 30, 1958 | M | Yoga | Android | Dec. 31, 2022 | Golf | North Carolina |
| S23 | Dec. 30, 1959 | M | Painting | Android | Jan. 1, 2025 | School Administration | Dallas |
| S24 | Aug. 29, 1960 | M | Car Repairing | iPhone | Jan. 1, 2024 | Grilling | California |
| S25 | Aug. 29, 1964 | M | Horse Riding | iPhone | Jan. 4, 2024 | Farming | Las Vegas |
| S5 | Dec. 30, 1954 | F | Yoga | Android | Jan. 1, 2025 | Cooking, Food, Travel | Virginia |
| S10 | Aug. 29, 1975 | F | Yoga | iPhone | Feb. 3, 2019 | Cooking, Food, Travel | Ohio |
| S12 | Aug. 29, 1965 | F | Cooking | iPhone | Apr. 3, 2022 | Books | Colorado |
| S13 | Aug. 29, 1967 | F | Reading Books | iPhone | Apr. 3, 2020 | Long Drive | Utah |
| S21 | Dec. 30, 1957 | F | Singing, Shopping | Android | Sep. 2, 2022 | Nursing | Alabama |

As shown in Table 1, considering, the date as Nov. 21, 2022. From Date of Birth (DOB), the metadata crawler may derive Age. From the Address, the metadata crawler may derive the state or Time-zone information. From Passion, Hobbies, the metadata crawler can derive his/her area of interests.

TABLE 2

Derived Metadata

| Name | Age | Category | Apple_Ind | Upgrade Recommender (Days) | Food_Lover_Ind | NFL_Lover_Ind | Upgrade Recommendation Indicator |
|---|---|---|---|---|---|---|---|
| S4 | 12 | Teens | N | 406 | N | N | N |
| S6 | 15 | Teens | Y | 406 | N | Y | N |
| S7 | 16 | Teens | N | 371 | N | Y | N |
| S8 | 18 | Teens | Y | 132 | N | Y | Y |
| S29 | 18 | Teens | N | 132 | N | N | Y |
| S30 | 18 | Teens | Y | 371 | N | N | N |
| S9 | 19 | Teens | N | 176 | N | Y | N |
| S26 | 16 | Teens | Y | 41 | N | N | Y |
| S27 | 19 | Teens | N | 193 | N | N | N |
| S28 | 19 | Teens | N | 41 | N | N | Y |
| S2 | 32 | Adult | Y | 193 | N | N | N |
| S11 | 45 | Adult | Y | −172 | N | Y | Y |
| S14 | 37 | Adult | Y | −37 | N | N | Y |
| S15 | 39 | Adult | N | 41 | N | N | Y |
| S19 | 37 | Adult | Y | 406 | N | N | N |
| S16 | 40 | Adult | N | 132 | N | Y | Y |
| S17 | 42 | Adult | N | 40 | N | N | Y |

TABLE 2-continued

Derived Metadata

| Name | Age | Category | Apple_Ind | Upgrade Recommender (Days) | Food_Lover_Ind | NFL_Lover_Ind | Upgrade Recommendation Indicator |
|---|---|---|---|---|---|---|---|
| S18 | 35 | Adult | Y | 371 | Y | N | N |
| S20 | 34 | Adult | N | 10 | N | Y | Y |
| S1 | 42 | Adult | Y | 41 | N | N | Y |
| S3 | 52 | Senior | N | 314 | Y | N | Y |
| S22 | 64 | Senior | N | 40 | N | N | Y |
| S23 | 63 | Senior | N | 772 | N | N | N |
| S24 | 62 | Senior | Y | 406 | Y | N | N |
| S25 | 58 | Senior | Y | 409 | N | N | N |
| S5 | 68 | Senior | N | 772 | Y | N | N |
| S10 | 47 | Senior | Y | −1387 | Y | N | Y |
| S12 | 57 | Senior | Y | −232 | Y | N | Y |
| S13 | 55 | Senior | Y | −962 | N | N | Y |
| S21 | 65 | Senior | N | −80 | N | N | Y |

Table 2, as shown above presents the derived metadata from the sample dataset. Once the information as shown in table 2 are derived, the system 102 may easily categorize and derive "Experience based Datasets". In an example, set of customers who likes Apple related products (Apple_Ind=Y), set of customers for which the system 102 may recommend upgradation of phones (Upgrade Recommendation Indicator=Y).

The experience driven data may then be used in more organizations or businesses units to improve, customer experience, location-based marketing, new Sales opportunities for any organization, target customer base. Examples of social metadata include ratings, chat transcripts, notes, tags, comments, glossary, and bookmarks as well. The metadata crawler may be run as a scheduled task to go over the existing sample data and metadata to derive some parameters which may become part of experience-based metadata.

Figure 3:
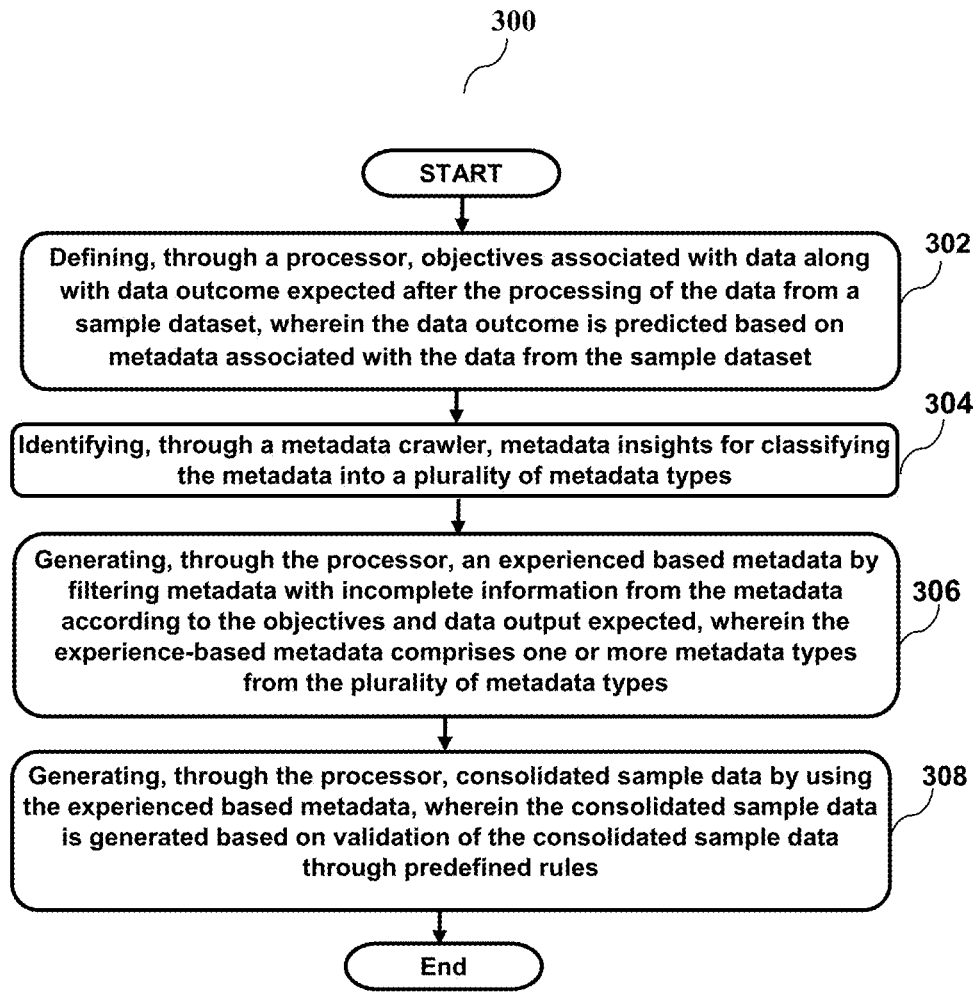
FIG. 3 illustrates a flow diagram of a method for consolidating data attributes for optimizing data processing, in accordance with an embodiment of the present subject matter.

Referring now to FIG. 3, the method 300 for consolidating data attributes for optimizing data processing through the system 102 is described. More specifically, FIG. 3 defines a process flow of the present embodiment highlighting the necessity to define an experience or use case as requirement and importance of derived metadata in filtration approach. The present embodiment suggests focusing on outcomes or parameters that business is looking for deriving from the process for more accurate business decisions. Once the parameters are known or defined, IT folks may work backwards to understand the situations, attributes, and business or technical process mapping. Once trackability is known, the system 102 engage each business unit to uniquely provide requirement to create data pipeline for few or specific data attributes with specific target customers. Once data pipelines are available from each of the business units, orchestration process can combine the data and present the data in requested format back to end client. Metadata crawling derive experience based, operational based metadata which may allow users to reduce the datasets appropriately and also cluster/generalize datasets. Description of the method 300 is similar to the system 102 and hence is not repeated for the sake of brevity.

As part of the method 300, at step 302, the method 300 provides defining objectives associated with the data along with data outcome expected through the processor 202 after the processing of the data from the sample dataset. the data outcome is predicted based on the metadata associated with the data from the sample dataset.

At step 304, the method 300 includes identifying metadata insights through the metadata crawler for classifying the metadata into the plurality of metadata types.

At step 306, the method 300 includes generating the experienced based metadata through the processor 202 by filtering metadata with incomplete information from the metadata according to the objectives and data output expected. The experience-based metadata comprises one or more metadata types from the plurality of metadata types.

At step 308, the method 300 generating the consolidated sample data through the processor 202 by using the experienced based metadata. The consolidated sample data is generated based on validation of the consolidated sample data through predefined rules.

The order in which the method 300 is described is not intended to be construed as a limitation, and any number of the described method blocks can be combined in any order to implement the method 300 or alternate methods. Additionally, individual blocks may be deleted from the method 300 without departing from the scope of the subject matter described herein.

Figure 4:
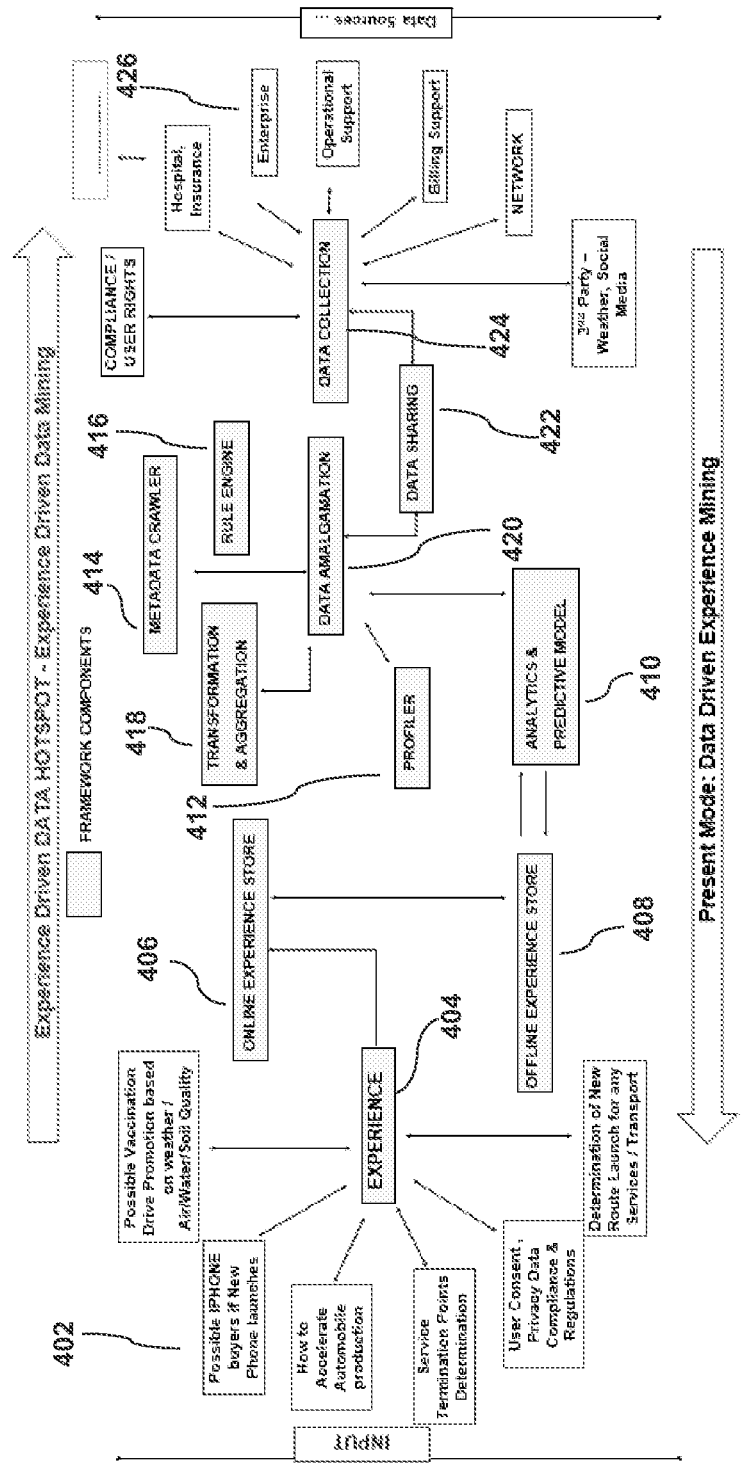
FIG. 4 illustrates an exemplary block diagram detailing consolidation of data attributes for optimizing data processing by the system, in accordance with an embodiment of the present subject matter.

Referring now to FIG. 4, an exemplary block diagram detailing consolidation of the data attribute for optimizing the data processing by the system (102) is shown. FIG. 4 illustrates two processes. The traditional current approach is illustrated from right to left, where every organization is trying to pull the data across all available sources to create a lakehouse/data warehouse/data mesh/data lake utilizing different processes like-data collections, amalgamation, profiler, rule engines, metadata crawler. Once, storage part is taken care, objective is to share the data to downstream steams or generating analytics, reporting to help business. The traditional approach is a good approach till, the user has control over the data generation. With current data age, new technology advancement & IoT (Internet of Things), users, usage devices are growing along with the associated data. With Big Data sizes is getting bigger day by day, consolidating of data across the sources are going to be an impossible task and may cause delay or latency in data processing. In the proposed system and method, traditional approach is changed and move towards a new process which is mentioned as "Left to Right, Experience driven Data Mining and the overall objective is to focus on user experience and dependent objects associated with the objects. In an embodiment, first step is to identify the data attributes & filtration criteria needed to derive the Experience to potentially reduce data volume thereby improving processing of data across business units or verticals more quickly than traditional way and normalize the data before applying analytics, which may lead to save time and make the system effective and efficient to unlock the data, in turn more accurate business decisions. Data Collection process is the last process component in the present method whereas in traditional approach, data collection is the first process which is a bottleneck if data grows significantly.

The system 102 first focus on the end result or outcome to be obtained after processing the sample dataset (input data 402) and then define the experience 404 or outcome or use case to be resolved as a requirement. Once the experience is identified, the system 102 performs data identification, data curation, data analytics. In an example as shown FIG. 4, the input data 402 may comprise possible vaccination drive promotion based on weather or air or water or soil quality, possible iPhone buyers if new phone launches, how to accelerate automobile production, service termination points determination, user consent, privacy data compliance & regulations, determination of new route launch for any services or transport. The Experience 402 may include online experience store 406 or offline experience store 408.

The metadata crawler is configured to provide automated way of identifying, analyzing, metadata insights across business verticals. With the system 102, Experience metadata is added which may be combination of business & technical, business & operational, or technical, operational along with persona-based experience driven metadata. Additionally, the system 102 may extend a mechanism to sample data as well to determine its catalog if columns or data sources are not providing enough information.

The rule engine 416 is configured to provide data quality, and if the audit and enrichment of data is appropriate and initially validated against the predefined active and approved rule sets or matrix before proceeding to later data processing lifecycle. Ruleset specification may follow traditional process of "single column content", "cross column/composite column content", "cross table verification".

An analytics and predictive model 410 configured in the system 102 may constantly monitor data anomalies and identify root causes of poor data quality & learn how to fix them and once the predictive process learns it, rules will route to get into rule matrix with possible work around for cleansing of the data.

Data curation may happen via 2-table tier "multi-hop" architectures focused on only attributes which are needed to provide as "Experience".

Since overall objective is to focus on user experience and its dependent objects, first step is to identify the data attributes & filtration criteria needed to derive the Experience. This will potentially reduce data volume thereby improving processing of data across business units/verticals more quickly than traditional way and normalize before applying analytics. This will lead to save time and will make system effective & efficient to unlock the data, in turn more accurate business decisions.

The profiler 412 module may be configured for data profiling. The profiler 412 may help to create data catalogue to search and access data easily and verify data validity (If customer data is expired or account is not active) and retention criteria within a collaborative user experience. Anyone may contribute metadata or add to the business glossary. The profiler 412 may ensure end-to-end data lineage, versioning, metadata, glossary, modelling, and enterprise search.

The transformation and aggregation or the computation module 418 provide partitioned data ready for an organization to serve users or take business decisions based on the derived dataset.

The data amalgamate module 420 may amalgamate metadata driven data and data attributes and associates to derive a unique aggregated, Semi-aggregated or columnar System of Record (SOR) data set quickly with reduced Opex, Capex Cost.

The data sharing module 422 shares data externally or internally. The experience driven datasets may be tagged to customers (B2B, B2C, B2B2X . . . ) may follow data privacy and sharing rights regulations and to ensure full anonymous to make sure end users' privacy and personal sensitive data is not compromised. All process for sharing data externally make sure to un-tag it and make it anonymous dataset without giving up even a fraction of data privacy, security, and ownership.

The data collection module 424 may be configured to collect the consolidated data and store in respective database/data repository.

The system 102 may provide a process to enable one-stop privacy compliance for all consumers and enterprise customers for all products and services. Additionally, a process to un-tag it and makes the consolidated dataset an anonymous dataset which is available upon consent of the end users. The data sources 426 may include compliance/user rights, hospital, insurance, enterprise, operational support, billing support, network, 3rd party—weather, social media, etc.

Figure 5:
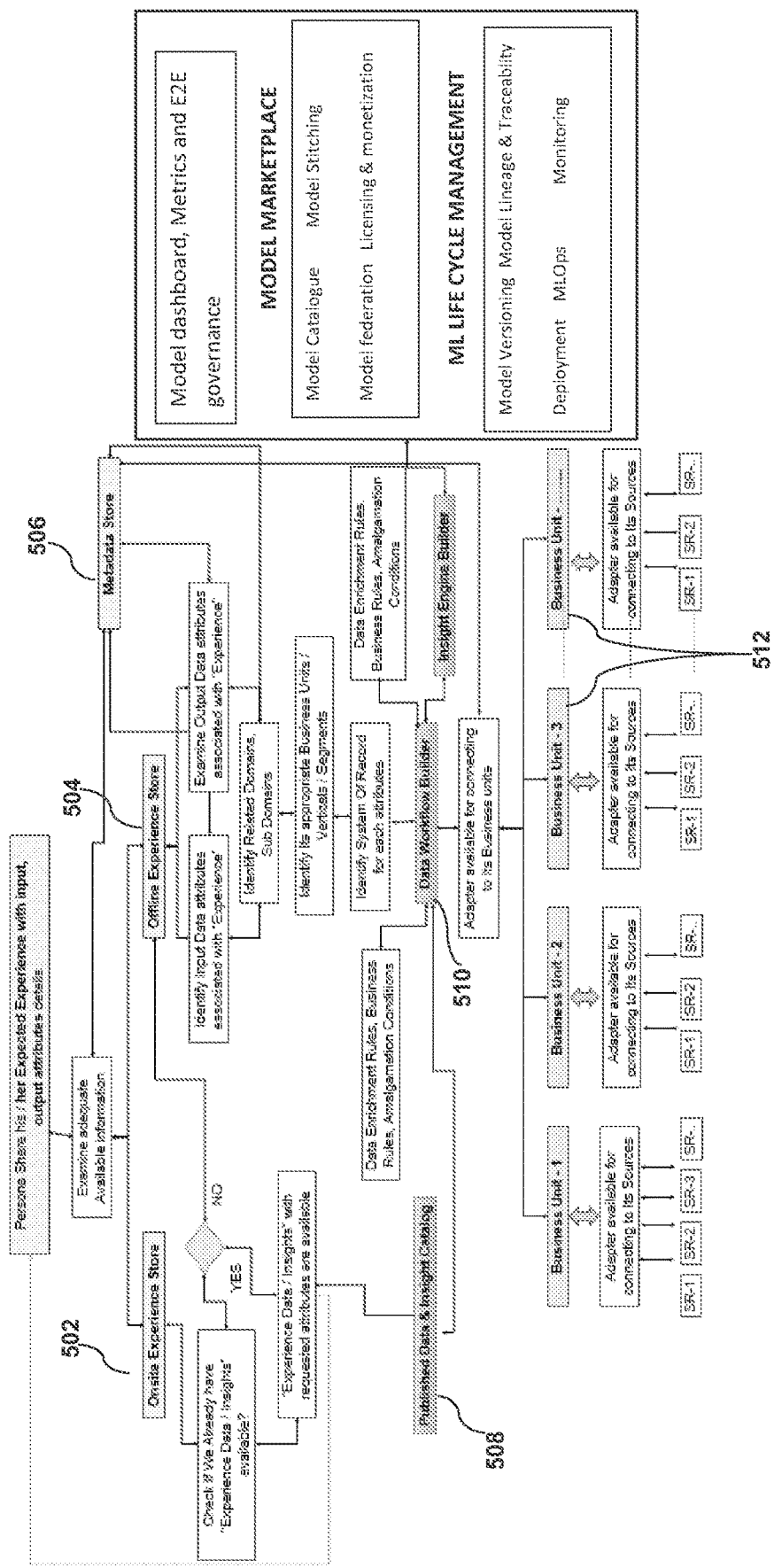
FIG. 5 illustrates an exemplary control flow diagram for consolidating data attribute for optimizing the data processing by the system, in accordance with an embodiment of the present subject matter.

FIG. 5 illustrates an exemplary control flow diagram for consolidating data attribute for optimizing data processing by the system 102. More specifically, FIG. 5 outlines a detailed step by step process of the proposed system 102 in which focus is the outcome first (define what experience/outcome/use case we want to resolve as requirement). Once the outcome is identified, data identification, curation, analytics or even solution discussion may kick off. The proposed system 102 may reduce overall data processing volume drastically (Experience specific data attributes, filtration criteria) which leads to cost saving, improve agility and overall advancement of data world towards outcome-based simplification.

The system 102 is configured to identify same entity and filters dataset. To put all data in one place and maintain is challenging. When an organization deals with legacy and different sources, the organization may come across multiple challenges unifying the data attributes which may represent the same data but because of different ways of representation the data may look different. In an example, some organization may use same entity with multiple systems of records (SOR) in which organization may have the same entities spread across different databases as result of decades of organic growth or due to mergers and acquisitions. In another example, some organization may use same entity and with no unique identifiers in which there are challenges for traditional rules-based solution to co-related and identify the same entity across databases without any consistent and/or unique identifiers. In another example, some organization may follow golden record 360-degree view in which, without being able to co-relate all the record of a single entity across multiple systems, organizations don't have a view of the real expanse of relationship they have with that entity. Thus, the proposed system 102 is defining an approach to tackle large-scale data management challenges in enterprises through bottom-up machine learning based approach to unify disparate datasets.

In an exemplary embodiment, at first, persona share his/her expected experience with input, output attributes details. Then, the system 102 examine adequate available information. To examine adequate available information, the system 102 may check onsite experience store 502, offline experience store 504 or metadata store 506. In onsite experience store 502, the system 102 may check if it has "Experience Data/Insights" available or not. If "Experience Data/Insights" are not available in onsite experience store, the system 102 may check offline experience store 504. A published Data & Insight Catalog 508 may provide experience data or insights. A data workflow builder 510 may identify System of Record (SOR) for each data attributes and then Identify Its appropriate Business Units/Verticals/Segments and related domains, Sub domains are identified from the appropriate Business Units 512.

Figure 6:
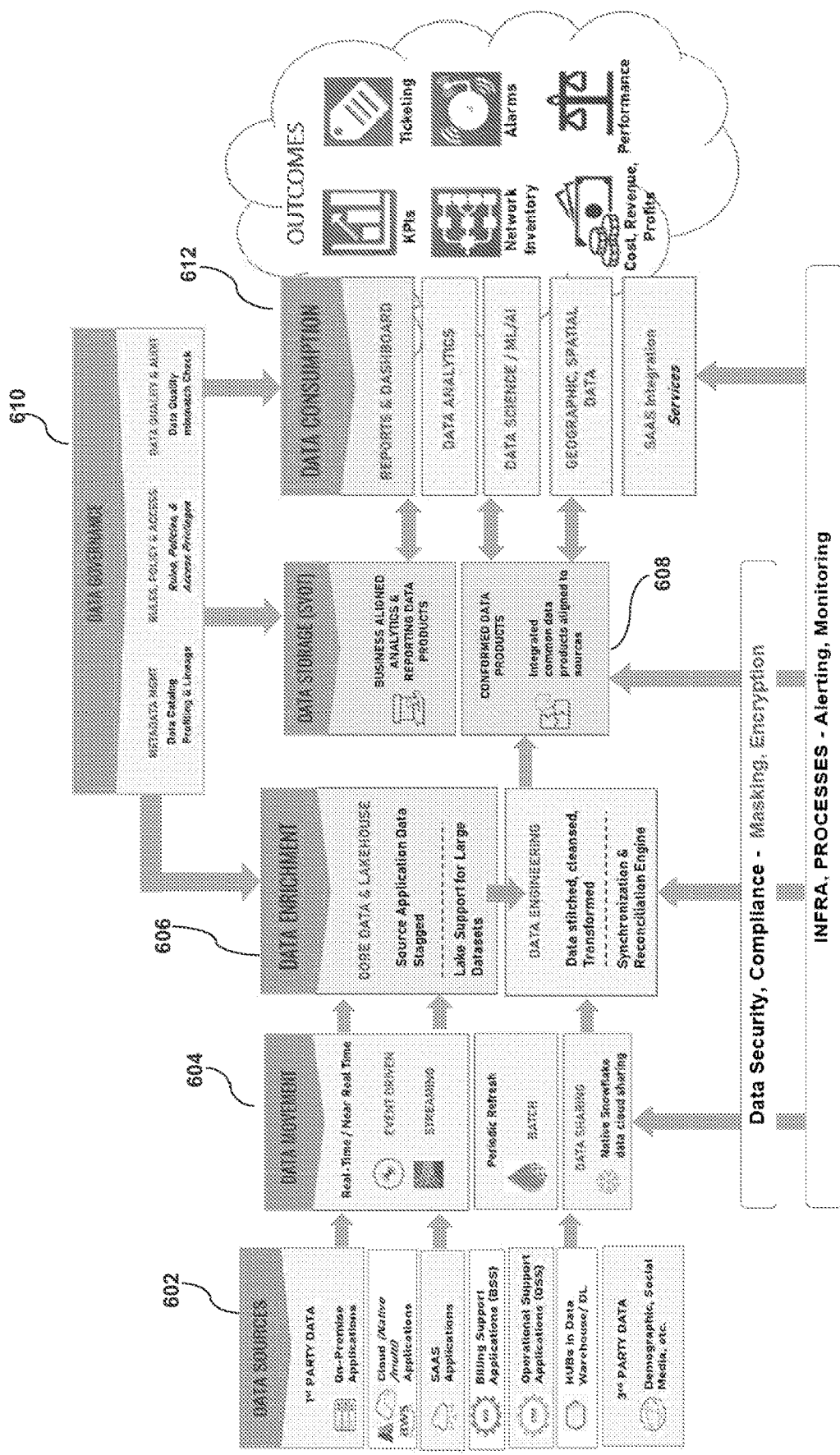
FIG. 6 illustrates another exemplary block diagram for consolidating the data attributes for optimizing the data processing by the system, in accordance with an embodiment of the present subject matter.

Referring now to FIG. 6, another exemplary block diagram for consolidating the data attributes for optimizing the data processing by the system (102) is described. More specifically, FIG. 6 illustrates high- and low-level subcomponent architecture of the "Experience Driven Data Mining" process and consists of all component details for data security, monitoring, governance process and different methodologies of data sharing or consumptions. As depicted in the FIG. 6, the present invention may include key components like data sources 602, data movement 604, data enrichment 606, data storage 608, data governance 610, data consumption 612. All the key components however overall integration envisioned to be loosely coupled to drive extension, extension, or customization for any organization. In each customized instances, all the components are not necessary and can be tweaked based on need.

Figure 7:
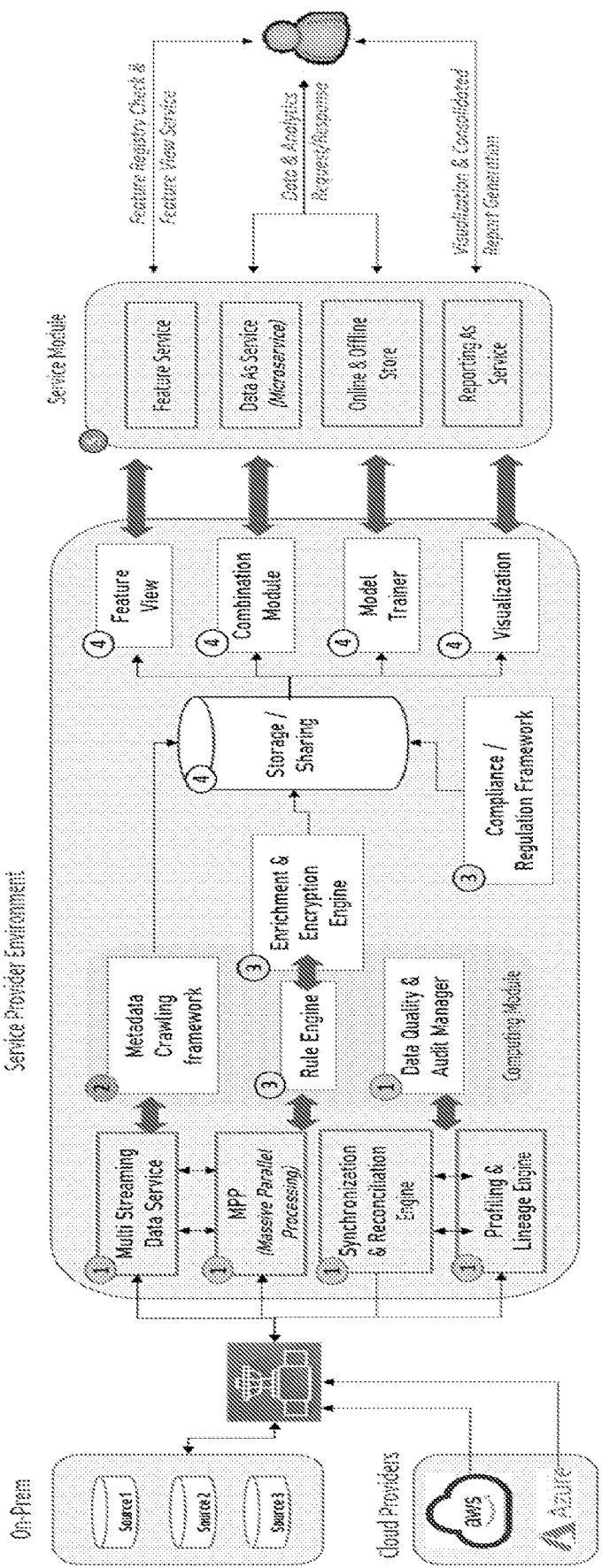
FIG. 7 illustrates another exemplary block diagram for consolidating the data attributes for optimizing the data processing by the system, in accordance with an embodiment of the present subject matter.

Now referring to FIG. 7, another exemplary block diagram for consolidating the data attribute for optimizing the data processing by the system (102) is described. More specifically, FIG. 6 illustrates high- and low-level subcomponent architecture of the "Experience Driven Data Mining" process and consists of all component details for data security, monitoring, governance process and different methodologies of data sharing or consumptions. Data Movement as A Service (DMaAS) is marked as (1) and may include multi service data streaming, massive parallel processing (MPP), synchronization and reconciliation engine or profiling and lineage engine. and metadata crawling framework (2) may include Enterprise Catalog. Rule engine (3) may include regulatory compliance & PIM (Personal Information Management) and enrichment/transformation/aggregation Engine. Storage or sharing (4) may include storage, computing, analytics and visualization as a service and auto scaling data managements. This includes a Feature/Attribute Store as well at enterprise level. The service module (5) may include cloud native, loosely coupled self-serviced service access points for different offerings like predictive Analytics utilizing enterprise level online and offline feature store with unified registry support, unlocking right small and wide range of data as service using microservice, pub-sub mechanism, data visualization and reporting as service across all business units.

Figure 8:
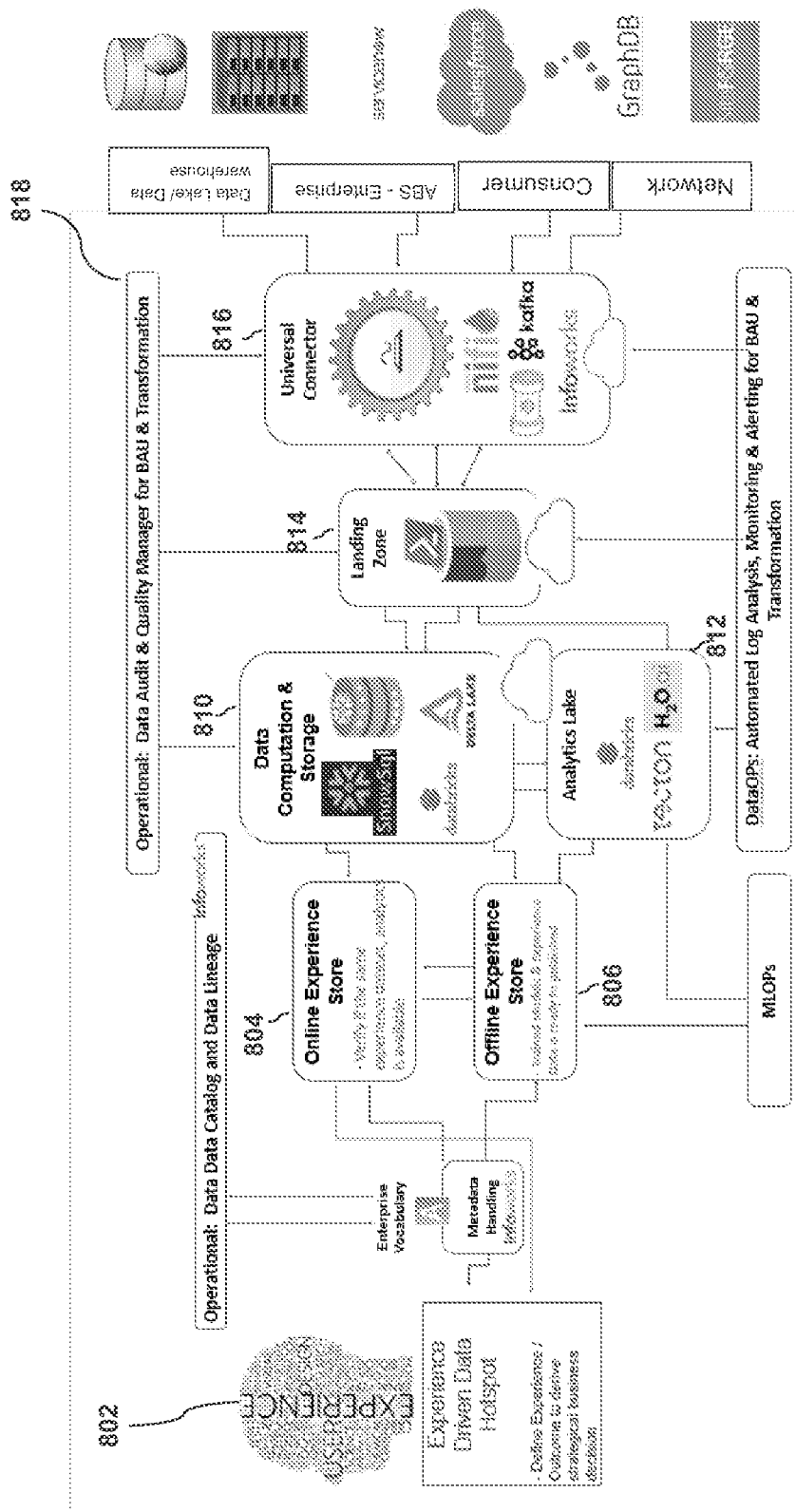
FIG. 8 illustrates an exemplary block diagram showing reference architecture and technological mapping for consolidating the data by the system, in accordance with an embodiment of the present subject matter.

Now referring to FIG. 8, an exemplary block diagram showing reference architecture and technological mapping for consolidating data by the system (102) is described. FIG. 8 shows technologies and high-level component level mapping of the system (FIG. 6) and approach to centralize all related operational process overheads to simplify data processing and fabrication.

In an example, one of the expected outcomes may include business leadership wants to launch a product (with additional capacities to improve customer experience in gaming & video streaming) for which upgrade options needs to be rolled out to eligible customers, identify target customers for this product, Activate the service "on the go". Additionally, with the new device, hyper-personalization must be enabled to improve customer experience with proactive network performance management.

In an exemplary embodiment, as a first step, the system 102 performs business outcome analysis first. Business Outcome analysis may include product catalogue with new product information (new capability around gaming & video streaming). Then the customers who are eligible for upgrade are identified by the system 102. The upgradation may be available for a) Currently, b) In Next 6 Month or c) Customers with previous early upgrade trend. The target customers for the new products ((Hobbies/Favourites having Game, Video streaming, watching movies etc.) are then identified. Hyper-personalization must be achieved in proactive notification, improve experience by seamless upgrades, network traffic redirects/balance to avoid stoppages. To avoid any stoppage during gaming/video streaming, network's CM (Configuration Management), PM (Performance Management) and Fault Management (FM) data and proactively inform customer in case any degradation needs to be monitored. After finishing the business outcome analysis, at step 2 data attributes are identified in step 2.

The data attributes for the product catalogue with new product information may include bundle info, price, category, subcategory, detail information, launch date, service start date, pre-requisite info. The data attributes for identifying Customers who are eligible for upgrade may include Billing Account Number (BAN), account status, billing address, service address, account activation date, unified billing account (bundle service), last name, first name, contact info (email, home, cell number), package info, receiver info (serial number, activation date), receiver ownership (leased/purchased), receiver location (family room etc.), smart card info (id, status, activation date), warranty date for receivers, contract dates (account, programming, hardware), account passcode, billing info (paperless bill, automatic payment, due date, bill, bill cycle, language preference), bill balance (current, previous and past due, total due), market, sub-market, previous upgrade ind (v/n), age, usage pattern, hobbies, favourites.

The data attributes for the target customers for the new products may include location id, state, city, postal code, address, aptno, CLI, usages (data)—type, duration, month, day, age, usage pattern, hobbies, favourites, etc. The data attributes for hyper-personalization in proactive notification, improve experience by seamless upgrades, network traffic redirects/balance to avoid stoppages may include radio technology device info, access/layer 1/layer 2, layer 3-ip core, QOS (Quality of Service) and dynamic ip, configuration management, performance management, fault management, location, market wise consumer availability, contact information, notification preference. At step 3, the system 102 performs reference architecture and technological mapping as shown in FIG. 8.

As shown in FIG. 8, the experience driven data hotspot (802) first defines Experience/Outcome to derive strategical business decision. After that the metadata crawler may identify metadata insights for classifying the metadata into a plurality of metadata types. The metadata crawler may refer Online Experience Store 804 or offline experience store 806. The metadata crawler may refer Online Experience Store 804 to verify if the same experience dataset, analytics is available. The metadata crawler may refer offline Experience Store 806 to trained models and experience data is ready to be published. The operational metadata may include data catalogue and data lineage. The data computation and storage module 810 and analytics lake 812 may provide data to online Experience Store 804 and offline Experience Store 806. A landing zone 814 may get data from data audit and quality manager for transformation of data. The network, consumer, ABS-enterprise, data lake/Datawarehouse (818) may connect with a universal connector 816. The universal connector 816 is a single collection and distribution mechanism for connecting with external sources for a purpose of extracting and interacting data and metadata.

Figure 9:
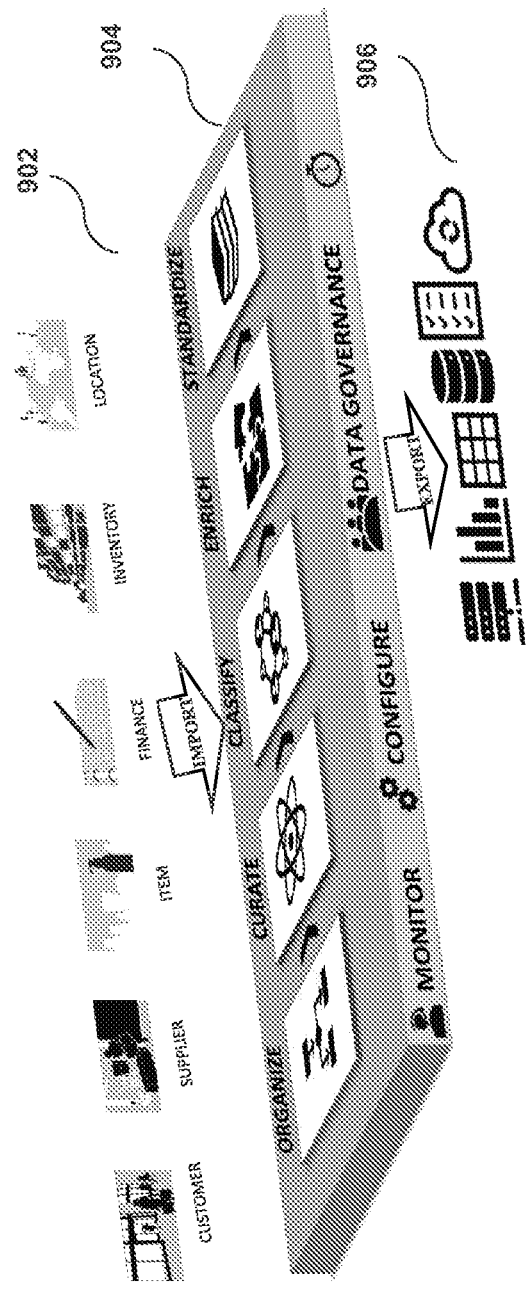
FIG. 9(a) and FIG. 9(b), illustrates exemplary diagrams for data co-relation, validation and verification while consolidating the data attributes for optimizing the data processing by the system, in accordance with an embodiment of the present subject matter.
Figure 9:
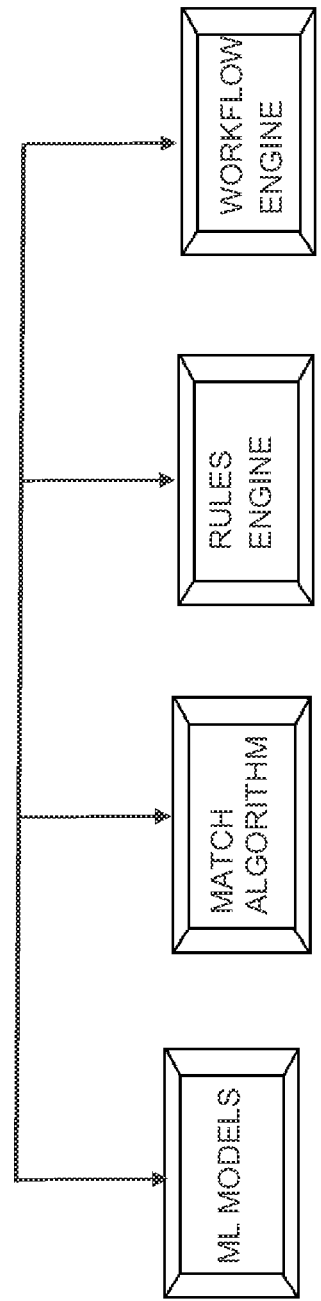

Now referring to FIG. 9(*a*) and FIG. 9(*b*) in combination, exemplary diagrams for data co-relation, validation and verification while consolidating data attribute for optimizing data processing by the system (102) is described. FIG. 9(*a*) and FIG. 9(*b*) illustrates different steps of data unification process which may help to tackle large-scale data management challenges in enterprises through bottoms up machine learning based approach to unify disparate datasets. In an embodiment, the proposed invention can be implemented for different platform (business leaders, architects, call center agents and all aspect of business and its associated profiles) to share their experience and expect outcome through the system 102. As shown in the exemplary diagram 9(*a*), the system 102 may connect different set of data 902 which may include customers, suppliers, items, finance, inventory or locations share their experience to provide a source of truth, visibility & insights for effective management of data along with AI driven data unification and AI driven recommendations 904 and may share the consolidated sample data with the different platform 906.

AI component of the proposed invention connects across all data to provide a source of truth, visibility & insights for effective management of data along with AI driven data unification and AI driven recommendations.

A data collection process may include match algorithms, rules engine, workflow engine to ensure collection, pre-validation, verification across any lines of business/domain of data as shown in FIG. 9(*b*).

The ML (Machine Learning) algorithms used in the proposed invention include locality sensitive hashing, levenshtein edit distance, enhanced sequential interference model. The ML algorithms may generate the matching score to ensure unification is achieved across the sources.

In an example, transaction and configuration details involved in the method 300 for consolidating data attributes for optimizing data processing through the system 102 are described as below.

Transaction of the Sample Data and Configuration of Consolidated Data and Organization's Resources:
- # of Customers: 120 Mn
- Data Storage: 110 TB (# of Core: 400)
- # of Data centers: 5 (Seattle, Dallas, Atlanta, Florida, New Jersey)
- Transaction Volume: 1.5B Transactions/day
- Data Movement Frequency:
    - Near Real time based on size of Golden gate trail files-Approx. 100-115 files/hour
- Protocols: HTTPS. HTTP
- Data Volume: (NRT Flows)
    - Normal Time: (Avg)
        - INSERT: 30 k/hr.
        - UPDATE: 1.5 Mn/hr.
        - DELETE: 21 k/hr.
    - Peak Time: (Avg)
        - INSERT: 40-45 k/hr.
        - UPDATE: 2-3 Mn/hr.
        - DELETE: 25 k-40K/hr.
- Data Volume: (Batch Flows-Daily)
    - Normal Time: (Avg)
        - INSERT: 2 k-5K
        - UPDATE: 1.5-2 Mn.
        - DELETE: 25K-30K
    - Peak Time: (Avg)
        - INSERT: 10-15 k.
        - UPDATE: 2-3 Mn.
        - DELETE: 30 k-40K In an exemplary embodiment, the system 102 may have operation data store (ODS) with consumer customer data having identity, account, service, order, Usage along with Location information as shown in Table 3.

TABLE 3

| | |
|---|---|
| Identity & User Information: | Personal Information |
| # Of Sources: 5 | including address, user id, |
| (S1, S2, S3, S4, S5) | password, locations, usage |
| Type of Sources: Oracle, Teradata | details, Passions, Hobbies, |
| Data Availability: Near Real Time via Golden Gate | public asset information |
| Data Size: Approx. 600 GB/Source | |
| Account Information | Account Related information - |
| # Of Sources: 6 | Account ID, Upgrade |
| Type of Sources: Oracle, Teradata | Details, Phone-Model, |
| Data Availability: Near Real Time via Golden Gate & JMS | Phone-Accessories, usage details |
| Data Size: Approx. 1 TB/Source | |
| Usage Information: | |
| # Of Sources: 3 | |
| Type of Sources: Oracle, Teradata | |
| Data Availability: 2 Near Real Time via Golden Gate & 1 Batch File via Informatica | |
| Data Size: Approx. 700 GB/Source for Real time sources and 300 GB for Batch File source. | |
| Service Information | Service Information - |
| # Of Sources: 8 | Bundle Services, Service |
| Type of Sources: Oracle, Teradata | Assets, Favourite services, |
| Data Availability: Near Real Time via Golden Gate & JMS | service termination or cancellation info, service |
| Data Size: Approx. 2 TB/Source | start/end dates, bill info |
| Location Information | Location information - past, |
| # Of Sources: 2 | present and tour information, |
| Type of Sources: Oracle, Teradata, Vertica | connection location end |
| Data Availability: Batch | points |
| Data Size: Approx. 250 GB/Source | |
| Payment Information | Payment history, Credit card |
| # Of Sources: 2 | info, Auto-Payment details |
| Type of Sources: Oracle, Vertica, MySQL | |
| Data Availability: Batch | |
| Data Size: Approx. 250 GB/Source | |
| Network Information | Network information - Site- |
| # Of Sources: 10 | cell, performance Mgmt., |
| Type of Sources: Teradata, Oracle, GraphSQL | Configuration Mgmt., Fault information. |
| Data Availability: Batch & Near Real time | |
| Data Size: Approx. 670 GB/Source | |

In an exemplary embodiment, estimated storage, process hardware utilization details for consolidating data attributes for optimizing data processing through the system 102 is described. Capacity of Data-Lakehouse is capacity is 14 TB from which utilized capacity is 8 TB.

# of Processes: 132 Jobs (33 Sources and processing data-Extract, Tranform, Load, Post Load)
Processing SLA: 1-3 hrs. Of Computing power
# of Tables: 95 (45 tables-Identity, User, Location, Payment, Services, Account, Location) & (30 tables-Network),
(20 tables-Reference Tables)
# of Data Attributes: 1,470
Timeline Taken to Establish this Process:
3+ Months with investment of $2.1 Mn. In impacting all sources, establishing these processes across full SDLC process. This includes Infra cost as well to support this additional capacity.
From OpeX, a team of 10 FTE (Full time employee) was estimated to support this overall setup-tends to cost of $1.5 Mn./year.

In an example, to have daily updates from all sources and all attributes, the system 102 may need 8 hrs to apply delta information. Analytics models may need at least 5-6 hrs to derive any predictive analytics and metadata.

In an exemplary embodiment, a comparison between the traditional process and the proposed method has been provided in table 4.

Some embodiments of the system 102 and the method 300 may implement in automatic identify and detection of sleeping cell to optimize network performance & enable self-healing actions that comprise automatically locking and unlocking the sleeping cell, which may potentially improve 15-20% of the current user experiences and proactive alerting may make customer happy and aware of the situation much better.

Some embodiments of the system 102 and the method 300 can easily amalgamate network (configuration, performance, site cell parameters) along with consumer (customer, subscriber, b2c etc.) to perform anomaly detection & prediction.

Some embodiments of the system 102 and the method 300 may experience being the primary driving force and can amalgamate datasets across business units (in current cases, Consumer, Network) and apply analytics to drive insights which can not only improve Customer experience but also help any organization to accurately determine the next growth opportunities with potential pros/cons and effectively can decide.

Some embodiments of the system 102 and the method 300 may provide business leaders an understanding and trend

TABLE 4

| Proposed Method (Experience Driven) | Current Old Process (Traditional Provess) | Observation |
| --- | --- | --- |
| Storage Utilization: 2 TB Process Information # of Tables: 25 Tables # of Jobs: 40 (ETL & Post Load) Data Attributes: 88 CapX & Opex CapX: $250k OpX: $400k/yr. | Storage Utilization: 8 TB Process Information # of Tables: 90 Tables 132 Jobs (ETL & Post Load) Data Attributes: 1,470 CapX & Opex CapX: $2.1 Mn OpX: $1.5 Mn./yr. | Overall approx. 25% process improvements, Turn around time to take any business decision will reduce from 3 Months to 20 days (70%) due to reduced data processing, filtration applied, less no of data attributes, sources, tables Capital & Operational Cost reduction around 35% observed. |

Exemplary embodiments discussed above may provide certain advantages. Though not required to practice aspects of the disclosure, the advantages may include those provided by the following features The embodiments of present disclosure herein address unresolved problem of high cost, high time and quality issues involved in the process of consolidating data attributes. The embodiment thus provides a method 300 and system 102 for consolidating data attributes for optimizing data processing using an experienced driven data mining and data analytics.

Some embodiments of the system 102 and the method 300 provides an extension to traditional process in a unique way to provision or derive more meaningful value from the sample predefined datasets and also extend horizon of overall metadata spectrum.

Some embodiments of the system 102 and the method 300 may save time and may make the system 102 effective, maintainable and cost efficient.

Some embodiments of the system 102 and the method 300 may define an approach to tackle large-scale data management challenges in enterprises through bottoms up machine learning based approach to unify disparate datasets.

Some embodiments of the system 102 and the method 300 may address some of the concerns like user's throughput improvement optimizing & load balancing GPL Layer, "QoE (Quality of Experience) improvement by proactively addressing Network performance degradation with Configuration, Performance Parameters tweaking of QoS (Quality of Service).

analysis by deriving the outcome first and then apply analytics to predict the future instead of processing a huge, big dataset to reduce the processing time, cost and effort.

Some embodiments of the system 102 and the method 300 may provide simple data processing efficiently with cost effective manner and less infrastructure.

Various other modifications, adaptations, and alternative designs are of course possible in light of the above teachings. Therefore, it should be understood at this time that, within the scope of the appended claims, the invention can be practiced otherwise than as specifically described herein.

The invention claimed is:
1. A method for consolidating data attributes for optimizing data processing, the method comprising:
defining, through a processor, objectives associated with data along with a data outcome expected after processing of the data from a sample dataset, wherein the data outcome is predicted based on metadata associated with the data from the sample dataset;
identifying, through a metadata crawler, metadata insights for classifying metadata into a plurality of metadata types;
generating, through the processor, an experienced based metadata by filtering metadata with incomplete information from the metadata according to the objectives and data output expected, wherein the experience-based metadata comprises one or more metadata types from the plurality of metadata types;

generating, through the processor, consolidated sample data by using the experienced based metadata, wherein the consolidated sample data is generated based on validation of the consolidated sample data through predefined rules; and monitoring, through the processor, data anomalies and identifying root causes of poor data quality based on execution of the predefined rules before processing the consolidated sample data, wherein the monitored data anomalies are fixed and the predefined rules are routed to a rule matrix for cleansing of the data, and wherein the predefined rules comprise single column content, cross column or composite column content, or cross table verification.

2. The method of claim 1, wherein the plurality of metadata types comprises business metadata, technical metadata and operational metadata.

3. The method of claim 2, wherein the technical metadata represents technical aspects of data, including attributes associated with data comprising data types, lengths, lineage, data formats, results from data profiling, information about origin of a data asset, wherein the technical metadata provides information about data sources, ownerships, transformations, freshness, usage, and archival of the data in the first dataset.

4. The method of claim 2, wherein the business metadata provides information about mapping information, business definitions, and rules information, domains or sub-domains associated with the data.

5. The method of claim 2, wherein the operational data refers to information about job execution logs, policies, default access restrictions, data sharing rules, error logs, audit results, various version maintenance plans, archive, and retention rules.

6. The method of claim 1, wherein comprising:
applying data privacy rules while sharing the consolidated sample data with external users.

7. A system for consolidating data attributes for optimizing data processing, the system comprising:
a processor;
a memory storing a plurality of instructions to be executed by the processor, wherein the processor is configured for:
defining, objectives associated with data along with a data outcome expected after the processing of the data from a sample dataset, wherein the data outcome is predicted based on metadata associated with the data from the sample dataset;

identifying, through a metadata crawler, metadata insights for classifying the metadata into a plurality of metadata types;

generating, an experienced based metadata by filtering metadata with incomplete information from the metadata according to the objectives and data output expected, wherein the experience-based metadata comprises one or more metadata types from the plurality of metadata types;

generating, consolidated sample data by using the experienced based metadata, wherein the consolidated sample data is generated based on validation of the consolidated sample data through predefined rules; and monitoring, data anomalies and identifying root causes of poor data quality based on execution of the predefined rules before processing the consolidated sample data, wherein the monitored data anomalies are fixed and the predefined rules are routed to a rule matrix for cleansing of the data, and wherein the predefined rules comprise single column content, cross column or composite column content, or cross table verification.

8. The system of claim 7, wherein the plurality of metadata types comprises business metadata, technical metadata and operational metadata.

9. The system of claim 8, wherein the technical metadata represents technical aspects of data, including attributes associated with data comprising data types, lengths, lineage, data formats, results from data profiling, information about origin of a data asset, wherein the technical metadata provides information about data sources, ownerships, transformations, freshness, usage, and archival of the data in the first dataset.

10. The system of claim 8, wherein the business metadata provides information about mapping information, business definitions, and rules information, domains or Sub-domains associated with the data.

11. The system of claim 8, wherein the operational data refers to information about job execution logs, operational metadata policies, data sharing rules, error logs, audit results, various version maintenance plans, archive, and retention rules.

12. The system of claim 7, wherein comprising:
applying data privacy rules while sharing the consolidated sample data with external users.

* * * * *